(12) United States Patent
Kindarji et al.

(10) Patent No.: US 8,700,912 B2
(45) Date of Patent: Apr. 15, 2014

(54) IDENTIFICATION BASED ON ENCRYPTED BIOMETRIC DATA

(75) Inventors: Bruno Kindarji, Paris (FR); Hervé Chabanne, Paris (FR); Julien Bringer, Paris (FR)

(73) Assignee: Morpho, Paris (FR)

( * ) Notice: Subject to any disclaimer, the term of this patent is extended or adjusted under 35 U.S.C. 154(b) by 512 days.

(21) Appl. No.: 12/809,848

(22) PCT Filed: Dec. 19, 2008

(86) PCT No.: PCT/EP2008/068121
§ 371 (c)(1),
(2), (4) Date: Jun. 21, 2010

(87) PCT Pub. No.: WO2009/083517
PCT Pub. Date: Jul. 9, 2009

(65) Prior Publication Data
US 2010/0281269 A1    Nov. 4, 2010

(30) Foreign Application Priority Data
Dec. 21, 2007   (FR) .................................... 07 60300

(51) Int. Cl.
*G06F 21/00*    (2013.01)
*G06K 9/00*    (2006.01)

(52) U.S. Cl.
USPC ............ 713/186; 382/115; 382/116; 382/124

(58) Field of Classification Search
None
See application file for complete search history.

(56) References Cited

U.S. PATENT DOCUMENTS

| | | | |
|---|---|---|---|
| 6,185,316 B1 * | 2/2001 | Buffam | 382/115 |
| 6,317,834 B1 * | 11/2001 | Gennaro et al. | 713/186 |
| 7,418,595 B2 * | 8/2008 | Eronen et al. | 713/168 |
| 8,005,277 B2 * | 8/2011 | Tulyakov et al. | 382/125 |
| 8,135,863 B2 * | 3/2012 | Nekovee et al. | 709/247 |
| 2008/0209226 A1 * | 8/2008 | Venkatesan et al. | 713/186 |

OTHER PUBLICATIONS

Tulyakov et al., "Symmetric hash functions for secure fingerprint biometric systems", 2006, Elsevier, pp. 2427-2436.*
"Public key Encryption with Keyword Search" by D. Boneh, G. Di Crescenzo, R. Ostrovsky and G. Persiano, EUROCRYPT 2004.
"Approximate Nearest Neighbors: Towards Removing the Curse of Dimensionality", by P. Indyk and R. Motwani, STOC 1998.
"Public key encryption that allows PIR queries", by D. Boneh, E. Kushilevitzn R. Ostrovsky (Alfred Menezes, editor, CRYPTO, vol. 4622, pp. 50-67, Springer 2007.

(Continued)

*Primary Examiner* — William Powers
(74) *Attorney, Agent, or Firm* — Miller, Matthias & Hull LLP (57) ABSTRACT

A database comprising biometric data stored in encrypted form is managed by a management unit. It comprises a set of filters respectively associated with filter identifiers. A biometric data item is received at a management unit; next, said biometric data item is stored in an encrypted form at a given address in the database. Then keywords are obtained on the basis of a first set of hash functions and of the biometric data item. A subset of indexing filters is associated with each keyword by selecting, for each keyword, filters as a function of the respectively associated filter identifiers, of said keywords, and of a second set of hash functions; and the given address is associated with each of the filters of the subset of filters.

13 Claims, 2 Drawing Sheets

(56) References Cited

OTHER PUBLICATIONS

"A public key cryptosystem and a signature scheme based on discrete logarithms", by Taher El Gamal (in CRYPTO, pp. 10-18, 1984).
"How to share a secret", by A. Shamir, Commun. ACM, 1979.
"Evaluating 2-DNF Formulas on Cipher-texts", by Boneh, Goh and Nissim, Theory of Cryptography, Second Theory of Cryptography Conference, LNCS3378, 2005.
"Space/Time Trade-offs in Hash Coding with Allowable Errors" by Burton H. Bloom, Computer Usage Company, Communications of the ACM, vol. 13 No. 7, pp. 422-426, Jul. 1970.
"Secure Indexes", by Eu-Jin Goh, p. 1-19, May 5, 2004.
"Private information retrieval", by Benny Chor, Eyal Kushilevitz, Oded Goldreich and Madhu Sudan (J. ACM, 45(6): 965-981, 1998).
"Probabilistic encryption and how to play mental poker keeping secret all partial information", by Goldwasser and Micali, ACM, 1982.

\* cited by examiner

IDENTIFICATION BASED ON ENCRYPTED BIOMETRIC DATA

CROSS-REFERENCE TO RELATED APPLICATIONS

This application is a U.S. national stage filing under 35 USC §371 of International Patent Application No. PCT/EP2008/068121 filed on December 19, 2008, which claims priority under the Paris Convention to the French Patent Application No. 07 60300, filed on December 21, 2007.

FIELD OF THE DISCLOSURE

The invention relates to an identity verification based on biometric data stored in a database, particularly when these data are stored in encrypted form.

Background of the Disclosure

Identification systems based on biometric data generally include a control unit which has access to a database containing biometric data, and the control unit is able to identify someone on the basis of these data.

The biometric data stored in this database originate from an enrollment phase in which a human trait, such as fingerprints or the iris, is captured as digital biometric data to be stored in the database and used as reference data when identifying someone.

When the control unit receives new biometric data, it is then able to identify the person with whom these new data are associated, on the basis of a comparison between these biometric data received and the reference biometric data stored in the database.

It should be noted that it is generally important for such biometric data to remain confidential, in order to protect the privacy of the persons associated with these data.

These biometric data may therefore be stored in encrypted form in the database.

In this case, the comparison step consisting of comparing the biometric data received from a control unit with biometric data stored in the database may then be much more complex than in the case where these biometric data are stored in the database without encryption.

One may then believe that the biometric data stored in the database must be decrypted in order to do this search. A decryption step would not only be likely to have a huge impact on the efficiency of such a database search, it would also limit the ultimate security.

There are, however, known search systems for searching a database that includes encrypted data.

Public key searchable encryption systems exist, such as the one described in the document by D. Boneh, G. Di Crescenzo, R. Ostrovsky and G. Persiano, "Public Key Encryption with Keyword Search", EUROCRYPT 2004, in which an encrypted database is searched using keywords determined on the basis of the same data but in their unencrypted form. Such a system can be advantageous, particularly for managing email archives for example. Such keyword-based searches eliminate the need to perform an exhaustive search of the database concerned and increase search efficiency.

This type of system could be useful in the context of identity verification based on encrypted biometric data.

However, using this type of system to perform keyword searches in an encrypted biometric database may yield incorrect results if the stored data are not decrypted.

It is possible, and even highly likely, that the biometric data obtained in an enrollment phase differ substantially from the biometric data obtained for the same person at a later time during an identification phase. In such a context, it is possible that the results obtained by applying the above public key searchable encryption principles are not relevant.

The invention aims to improve this situation.

Summary of the Disclosure

A first aspect of the invention proposes a management process for a database comprising biometric data stored in encrypted form,
said database comprising a set of indexing filters respectively associated with filter identifiers,
wherein said process comprises the following steps at a management unit:
/1/receiving a biometric data item;
/2/storing, at a given address in the database, said biometric data item in encrypted form;
/3/obtaining keywords based on a first set of hash functions and on said biometric data item;
/4/associating a subset of filters with each keyword by selecting filters for each keyword as a function of the respectively associated filter identifiers, of said keywords, and of a second set of hash functions; and
/5/associating said given address in encrypted form with each of the filters in the subset of filters.

In the following description, "indexing filter" is understood to mean a filter which enables representing relations between data by association with filter indexes, such as Bloom filters for example.

The database here is therefore structured on the basis of filters. These filters are initially empty. They are updated as the biometric data to be stored is received.

Advantageously, this update is done such that the filters concerned are respectively associated with keywords obtained based on the biometric data item received.

In this manner, a database is obtained in which it is possible to perform keyword searches on the basis of data stored in encrypted form, without having to conduct an exhaustive search of the database.

Through these measures, in this database at least one biometric data item is associated with a subset of filters, via the filter structure.

In addition, the keywords respectively associated with the set of filters advantageously result from the biometric data item received. It is therefore unnecessary to store these search keywords in order to perform later searches in the database constructed in this manner.

In fact, when a search is requested in such a database, it is sufficient to determine the keywords corresponding to the search by applying a family of hash functions to the biometric data item to be verified.

In one embodiment of the invention, step/3/is implemented by the following steps:
   obtaining respective first hash values by applying the first set of hash functions to the biometric data item;
   obtaining said keywords by respectively combining said first hash values with respective identifiers of the hash functions in the first set.

By proceeding in this manner, it is possible to determine keywords from the hash functions used and from a biometric data item. Preferably, these hash functions in the first set each have the property, for input values that are neighbors in a metric space, of providing very similar values and preferably the same value as output in a second metric space.

By proceeding in this manner, a database is prepared that is adapted for a search based on keywords which can be variable values close to the biometric data item considered. In other words, a search in this database adapted for certain keywords can be done on keywords which do not have exactly the same values but which have neighboring values. Such an encrypted database is adapted for searching for keywords resulting from biometric data which may have different values in two separate biometric data captures.

In one embodiment of the invention, step /4/ is implemented by the following steps:
  obtaining second hash values by respectively applying the second set of hash functions to the keywords;
  obtaining the subset of indexing filters by selecting each filter with an associated filter identifier corresponding to said second hash values.

By proceeding in this manner, a database is constructed that is adapted for searching on the basis of keywords, with the relations between keywords and biometric data being represented in the form of filters. This second set of hash functions applied to the keywords allows distributing the representation of keywords across different filters. This second set of hash functions can correspond to cryptographic hash functions, in a manner that obtains an advantageous distribution.

A first and a second family of hash functions can be initially determined, with the first and second sets of hash functions respectively being a subpart of said first and second family of hash functions.

Step /4/ can additionally be implemented on the basis of an error limit. In one embodiment of the invention, it may be advantageous to take into consideration in the obtaining of keywords, not only the first hash values but also values neighboring these hash values. This is particularly the case when using hash functions from the first set of hash functions of the type described in the document "Efficient search for approximate nearest neighbor in high dimensional spaces" by Eyal Kushilevitz, Rafail Ostrovsky and Yuval Rabani.

The first set of hash functions can be LSH, for example as described in the document by P. Indyk and R. Motwani, "Approximate Nearest Neighbors: Towards Removing the Curse of Dimensionality", STOC 1998, and the second set of hash functions can be cryptographic.

Advantageously, the filters in the set of filters can be Bloom filters, as defined in "Space/time trade-offs in hash coding with allowable errors" by Burton H. Bloom, 1970. These allow encoding a property of set membership while optimizing storage space in a probabilistic manner.

A second aspect of the invention proposes a process for identifying a biometric data item in a database managed by a management process according to the first aspect of the invention,
said database comprising a structure based on filters $(B_1, \ldots, B_n)$;
wherein said process comprises the following steps at an identification unit which has access to the database:
  /i/ receiving a query indicating hashed keywords;
  /ii/ in the database (10), determining filters associated with said hashed keywords;
  /iii/ obtaining a list of database addresses in encrypted form which are respectively associated with said determined filters;
  /iv/ deciding that the keywords have a correspondence in the database, when a same address in said list of addresses is associated with at least a determined number of filters.

Advantageously, the database managed according to the first aspect of the invention can be utilized here by a keyword-based search based on properties of the filter structure of this database, particularly indexing filters.

The determined number of filters can be selected as a function of the error rate that it is decided to accept.

Advantageously, the hashed keywords can be received from a transmitter at the identification unit, said transmitter having obtained the hashed keyword by the following steps:
  capturing a biometric data item;
  obtaining hash values by respectively applying a third set of hash functions to said captured biometric data item;
  obtaining keywords by respectively combining said first hash values with respective identifiers of hash functions in the third set; and
  obtaining hashed keywords by applying a fourth set of hash functions to said keywords.

By proceeding in this manner, at the transmitter, the keywords used for the search are obtained based on a newly captured biometric data item. It should be noted that the keywords used to search a database according to one embodiment of the invention are not stored, but are obtained from biometric data captured either at the time of enrollment to construct the database or at the moment of a biometric data identification.

The first and third sets of hash functions can come from a first family of hash functions and the second and fourth sets of hash functions can come from a second family of hash functions.

Note that it may be advantageous to apply a larger number of hash functions from the first and second families of hash functions at the time of enrollment than the number of hash functions from the first and second families of hash functions applied at the moment of an identification.

A third aspect of the invention proposes a database management unit adapted to implement a management process according to the first aspect of the invention.

A fourth aspect of the invention proposes an identification unit adapted to implement an identification process according to the second aspect of the invention.

A fifth aspect of the invention proposes an identification system comprising a database management unit according to the third aspect of the invention, a database, and an identification unit according to the fourth aspect of the invention.

Other features and advantages of the invention will be apparent from the following description of one of its embodiments.

BRIEF DESCRIPTION OF THE DRAWINGS

The invention will also be better understood by referring to the attached drawings, in which.

DETAILED DESCRIPTION OF THE DISCLOSURE

In the context of the invention, "biometric data" is understood to mean data concerning a human being which identify that person. These biometric data are generally obtained by a sensor. Such a sensor can be adapted to capture biometric data such as fingerprints, an iris scan, a facial scan, signature dynamics, or a voice print for example.

Figure 1:
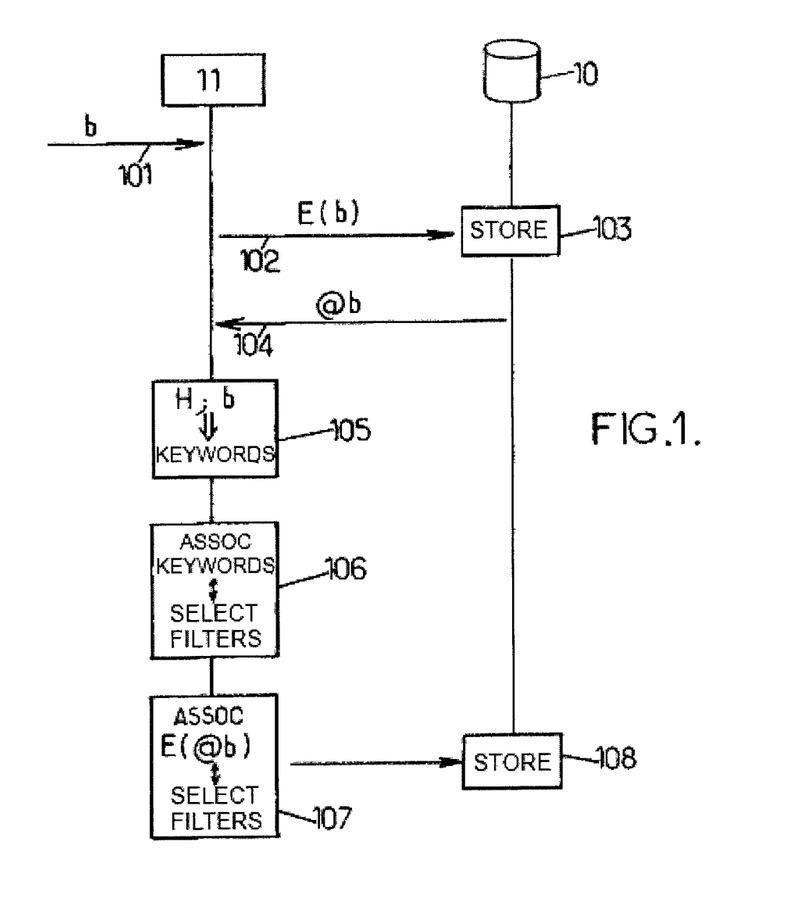
FIG. 1 illustrates the main steps of a database management according to one embodiment of the invention.

FIG. 1 illustrates the main steps of a database management process according to one embodiment of the invention.

A management unit 11 is in charge of managing a database 10 adapted to store encrypted biometric data in a manner that allows a keyword-based search according to one embodiment.

The management unit 11 receives a message comprising a biometric data item b to be stored in the database in encrypted form, as reference data for later identification searches.

This biometric data item b is encrypted at the management unit 11 into an encrypted biometric data item E(b), using a public key for example.

Then this encrypted biometric data item E(b) is sent to the database 10 by a message 102. The database stores this encrypted data item in step 103 and sends a message 104 to the management unit 11 indicating the storage address @b of the encrypted biometric data item.

In step 105, at the management unit 11, keywords are obtained on the basis of the biometric data item b and of a first set of hash functions $h_\alpha$, where a is an integer between 1 and μ. In this step, the hash functions $h_\alpha$ from the first set can be applied to the biometric data item b. Thus p hash values are obtained, denoted $c_a$, which satisfy:

$$c_\alpha = h_\alpha(b)$$

Such a database construction step will therefore allow recognizing that two biometric data items, one being an encrypted biometric data item of reference in the database, come from the same person, even if these two biometric data items are substantially different.

Then these values $c_a$ can be combined with the value α, for example by concatenating a to the value $c_a$. The value resulting from such a concatenation is denoted $c_a//\alpha$. After such a step, there are μ keywords associated with the biometric data item b.

In step 106, each of these keywords is associated with a subset of indexing filters. To form the subset of indexing filters to be associated with each of these keywords, filters can be selected from the set of filters as a function of the associated filter identifiers, of the keywords, and of a second set of hash functions $h'_\beta$, where β is between 1 and v.

For this purpose, in step 107, filters can be selected which have an identifier corresponding to the hash values obtained by applying the second set of hash functions to the keywords. Thus the address of the biometric data item is associated with the filters $B_i$ which have identifiers i satisfying:

$$i = h'_\beta(h_\beta(b)//\alpha)$$

Then in step 108, in the subset of selected filters, the address of the biometric data item b is stored in encrypted form E(@b). The biometric data item b is thus associated with the subset of indexing filters.

In one embodiment of the invention, Bloom filters are used. The following sections concern this type of filter.

Consider a set of relatively large size, for example the set of binary words, and S a subset of this set D of size I, a positive integer. By constructing this type of filter, one can test in a probabilistic manner whether an item x is a member of the set S. Note that it is possible for there to be some false positive responses. However, in the context of Bloom filters it is not possible for there to be false negatives. Because of this probabilistic component, a more compact structure than a simple lookup table can be obtained.

Let us consider a family of k hash functions h, where k is a positive integer, defined for the set D and with incoming values within the set of integers between 1 and m.

Under these conditions, an associated Bloom filter (k;m) corresponds to a family of binary elements (B1, . . . , Bm) initially initialized to 0, defined as follows:

for any integer i between 1 and I and j between 1 and k, we define:

$$B_{h^j(a^i)} = 1$$

where S is composed of elements $a_i$, where i is an integer between 1 and I.

In this context, to verify whether an element x belongs to S, it is sufficient to verify that for any integer j between 1 and k, the following equation is satisfied:

$$B_{h^j(x)} = 1$$

The probability of a false positive can then be negligible, for a choice of m and k which depends on I.

Bloom filters can advantageously be applied in a storage context in one embodiment of the invention. The intent is to associate a set of values with each element of S. Here, during the database management, the intent is to associate a set of filter identifiers with each keyword obtained from a biometric data item according to one embodiment of the invention.

To do this, the document "Public key encryption that allows PIR queries" by D. boneh, E. Kushilevitz, R. Ostrovsky (Alfred Menezes, editor, CRYPTO, volume 4622, pages 50-67, Springer 2007) proposes a Bloom filter construction with storage.

Let V be a set of values and R a relation associating the elements v of the set V with the elements of the set S.

The filters (B1; . . . ; Bm) are all initialized to the empty set then updated as follows:

for any integer i between 1 and I, where I is an integer representing the size of the set S, for any integer j between 1 and k, and for any element v of the set V such that v has a relation R with $a_i$, then the element v is associated with the filter $B_{h^j(a^i)}$. Thus if the set X included in the set V is associated with an element $a_i$ of S then we have, for any integer j between 1 and k, the set X which is included in the filter $B_{h^j(a^i)}$.

There is then a high probability that an element a is an element of S if and only if the result of the intersection of all filters $B_{h^j(a)}$ where j is between 1 and k, is non-empty.

In one embodiment of the invention, one or even several families of LSH (Locality Sensitive Hashing) functions are applied as input to such Bloom filters.

An LSH function is a hash function which has the property of providing a similar result when it is applied to neighboring points in a metric space. Such a function is defined in particular in the document "Approximate nearest neighbors: Towards removing the curse of dimensionality" by P. Indyk and R. Mpotwani, STOC 1998.

Let B be a metric space, U a set of values coming from hash functions of the family considered, and r1 and r2 two real numbers satisfying:

$$r1 < r2$$

let p1 and p2 belong to the set [0,1] and satisfying:

$$p1 > p2$$

and let there be a family H of hash functions $h1, \ldots, h_p$.

Any function $h_i$, where i is between 1 and μ, mapping from B to U, is a function (r1, r2, p1, p2)-LSH, if for any function $h_i$ in the family H, and for any element a and b of the set B, we have:

if $d_B(a,b) < r1$, then $Pr[h_i(a)=h_i(b)] > p1$ and if $d_B(a,b) > r2$, then $Pr[h_i(a)=h_i(b)] < p2$ where $d_B(a,b)$ is the distance between a and b elements of B in the metric space B.

One can for example take a family H of LSH functions corresponding to the set of all canonical projections in the Hamming space $\{0, 1\}^n$.

In this case, each function $h_i$ establishes a correspondence between a value $x_i$ and a set of values $(x_1 \ldots x_n)$.

Then for all r1 and r2 belonging to the set of integers between 1 and n, and satisfying:

r1<r2, the functions $h_i$ are called functions $(r_1, r_2, 1-r_1/n, 1-r_2/n)$-LSH.

In the context of the invention, it is also advantageous to implement a family of LSH functions as proposed in the document "Efficient search for approximate nearest neighbor in high dimensional spaces".

Here, B is the set of all n-tuples of $\{0, 1\}^n$ and the vector to be hashed is denoted:

x=(x1, ... xn) in B.

The construction is based on random vectors of chosen weights. Thus, β is taken from the set [0, 1] and a random vector r of B is constructed such that each coordinate of r is equal to β with a probability of β

The resulting hash function $h_r$ can then be defined as follows:

$$h_r: x \to h_r(X) = \sum_{i=1}^{n} x_i \cdot r_i$$

Then a number t of vectors $r_1$ to $r_t$ are chosen to obtain a hash function h such that:

$h=h_{r1}, \ldots, h_{rt}$: B->$\{0,1\}^t$

Thus, let x be an element of B, and r1, it elements of B, corresponding to random vectors verifying that each bit of one of these elements has been generated randomly with a probability of β.

A positive number $δ_1$ therefore exists such that for any positive ε, a and b being elements of B, two elements of the database such that:

$d_B(x,a) < I$ and $d_B(x,b) > (1+ε) \cdot I$ where I=½β, a constant $δ_2$ therefore exists such that:

$δ_2 = δ_1 + δ$ where δ is positive and dependent only on the value of E for which:

$$Pr\left[d_B(h(x), h(a)) > \frac{(2δ_1 + δ_2)}{3}t\right] \leq e^{-\frac{2}{9}δ^2 t}$$

$$Pr\left[d_B(h(x), h(b)) < \frac{(2δ_2 + δ_1)}{3}t\right] \leq e^{-\frac{2}{9}δ^2 t}$$

A Bloom filter allows encoding a property of set membership while optimizing space, and doing so in a probabilistic manner.

Here, in the context of the invention, such Bloom filters are based on LSH hash functions as described above, followed by cryptographic hash functions.

In one embodiment of the invention, more space is used around the biometric data considered in order to allow greater tolerance for error between two biometric data items originating from two different captures but for the same person.

More specifically, for a LSH family of functions as defined above and in the document "Efficient search for approximate nearest neighbor in high dimensional spaces", a plurality of reduced sets of biometric data $c_1$ to $c_μ$ is calculated from a set of captured biometric data b, such that, for an i between 1 and μ, we have:

$c_i = h_i(b)$

In this context, by constructing the family of functions used here, it is possible to deduce with a significant probability that reduced sets $c_i$ obtained by the same method as the one used for reduced sets $c_i$, but based on a new capture of a biometric data item b', are respectively at a distance d from the reduced sets $c_i$, this distance d satisfying:

d<λt where λ is a constant less than 1, which only depends on the first family of hash functions H and on errors that it is decided can be tolerated between the set of biometric data b and the set of biometric data b'.

A Bloom filter (v, m) is associated with a second family of hash functions H'=$\{h_1', \ldots, h_v'\}$; this second family of hash functions aims to establish a good distribution in the storage of data in the different Bloom filters B.

Then hash values for all reduced sets $c_i'$ which are at a distance less than λt from $c_i$ are determined by applying a set of hash functions from the second family H'.

By proceeding in this manner, it is possible to have a high probability of avoiding false negative responses during a keyword-based search of the database.

Figure 2:
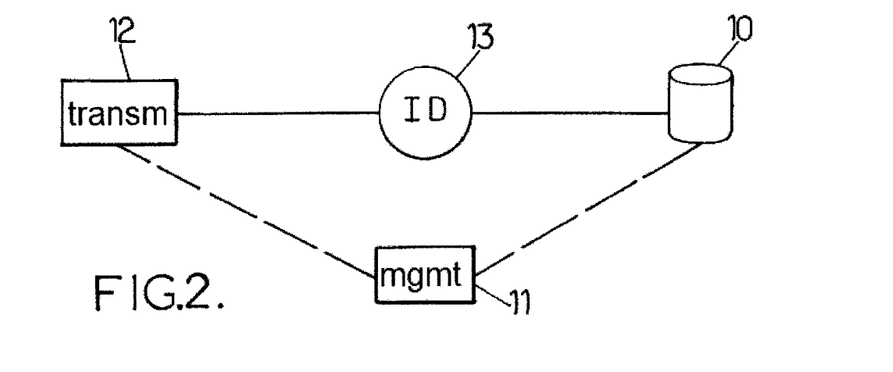
FIG. 2 illustrates an identification system according to one embodiment of the invention.

FIG. 2 illustrates an identification system according to one embodiment of the invention. Such an identification system comprises a management unit 11, a transmitter 12 which comprises a biometric data sensor, a database 10, and an identification unit 13.

The management unit 11 has an interface with the database 10 for managing the enrollment. It can also have an interface with the transmitter in the case where the enrollment biometric data come from this transmitter. No limitation is placed on the source of the biometric data that the management unit 11 receives in the enrollment phase.

The identification unit 13 is adapted to communicate with the transmitter and with the database 10 in order to manage an identification phase.

It is possible to have the queries based on keywords according to one embodiment of the invention be sent directly from the transmitter to the database 10. For this purpose, there can also be an interface between the transmitter 12 and the database 10.

However, in the example in the following sections, the messages between the transmitter and the database pass through the identification unit 13.

In order to increase the level of protection on the confidentiality of exchanges within this identification system, secure communication links can advantageously be used.

To achieve this, it is possible to encrypt and sign all exchanges between the units of this system. For example, encryption mechanism principles can be used such as those described in the document "A public key cryptosystem and a signature scheme based on discrete logarithms" by Taher El Gamal (in CRYPTO, pages 10-18, 1984). In the following description, E denotes an encryption function associated with this system and D the corresponding decryption function.

Note that where the description states an encryption function, a decryption function can easily be applied, and where it states a decryption function, an encryption function can be applied.

Also for the purpose of increasing the level of protection on the confidentiality of data processed in this system, a protocol such as the Private Block Retrieval protocol can be used for communication between the database 10 and the management unit 11 and/or for communication between the database 10 and the identification unit 13, as defined in the document "Private information retrieval" by Benny Chor, Eyal Kushilevitz, Oded Goldreich, and Madhu Sudan (J. ACM, 45(6): 965-981, 1998). By proceeding in this manner, the database 10 has no access to any information concerning the user who is currently being enrolled or identified.

In this system, a capture of a user is made at the transmitter 12. Then, the biometric data item b' resulting from this capture is sent to the identification unit 13, which requests from the database 10 a recognition or identification of this captured biometric data item b'.

If this biometric data item is not recognized in the content of the database 10, it means that the user is not recorded in the database and the transmitter 12 can be so informed.

In this system, an enrollment phase is managed at the management unit 11, the purpose being to save reference biometric data for the users enrolled, and an identification phase is managed at the identification unit 13, the purpose being to determine whether a user is previously known to the system on the basis of a comparison between reference biometric data and newly captured biometric data.

The following table describes a structure of the database 10 according to one embodiment of the invention.

| Filters | Content |
| --- | --- |
| B1 | $\{E(a_{1,1}), \ldots, E(a_{p1,1})\}$ |
| ... | |
| $B_m$ | $\{E(a_{1,1}), \ldots, E(a_{pm,m})\}$ |

The different filters correspond to respective Bloom filters which are used in the context of the invention.

The elements $E(a_{i,j})$ contained in the filters $B_1$ to $B_m$ correspond to biometric data addresses stored in the following table structure, in an encrypted form.

The following table describes the storage structure for the biometric data.

| Label | Data |
| --- | --- |
| @($b_1$) | $E(b_1)$ |
| ... | ... |
| @($b_N$) | $E(b_N)$ |

In one embodiment of the invention, a first family of LSH hash functions H and a second family of cryptographic hash functions H' are previously determined. Knowledge of these families is shared by the transmitter 12 and the management unit 11. However, it is not required that these families of hash function be known to the identification unit 13.

The hash functions used for the enrollment phase at the management unit 13 are not necessarily the same as those used during the identification phase at the transmitter, but they come from the same two shared families of hash functions H and H'. Advantageously, a larger number of hash functions can be applied in the enrollment phase than in the identification phase, in order to limit future errors during an identification.

During the enrollment phase, a number p of LSH hash functions are determined, $h_i$ to $h_\mu$, mapping from the B space to the space $\{0,1\}^t$ of the first family of functions H.

A number v of functions of the second family H', meaning those dedicated to a Bloom filter with storage, denoted to $h'_v$, is also determined such that:

$$\{0,1\}^t \times [1,\mu] \rightarrow [1,m]$$

Initially, the database 10 is empty and the Bloom filters $B_j$ where j is between 1 and m, are initialized to the empty set.

Figure 3:
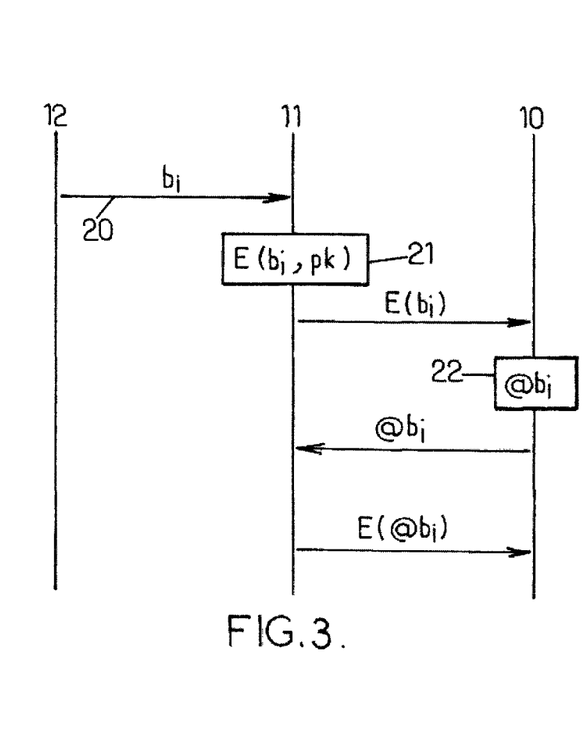
FIG. 3 illustrates an enrollment phase according to one embodiment of the invention.

FIG. 3 illustrates such an enrollment phase according to one embodiment of the invention.

Each user of the system provides a set of biometric data $b_i$ captured at the management unit 11 which is adapted to manage the database. No limitation is placed on the method used to carry out such a step. For example, this step can be done by the transmitter 12 via the management unit 11.

Then the management unit 11 encrypts $b_i$, in step 21, using the encryption function E and using a key pk associated with the management unit 11. The set of data encrypted in this manner, denoted E($b_i$), is stored in the database 10.

The database 10 is thus filled with sets of encrypted biometric data E($b_i$) respectively stored at addresses @$b_i$ in the database in step 22.

Then the addresses @$b_i$ are sent from the database 10 to the management unit 11.

On the basis of these addresses @$b_i$, the management unit is then able to update the Bloom filters which are stored in the structure as described above in the database 10.

For this purpose, the management unit 11 calculates values $c_\alpha$ for any integer a between 1 and µ, according to this equation:

$$c_\alpha = h_\alpha(b_i)$$

When hash functions are used of the types defined in the "Efficient search for approximate nearest neighbor in high dimensional spaces" document cited above, a supplemental step for obtaining the keywords can advantageously be provided.

This supplemental step consists of deducing corresponding sets $C_\alpha$ according to this equation:

$$C_\alpha = c_\alpha + \{e \square \{0,1\}^t\}$$

where e is a vector of $\{0,1\}^t$ of length t comprising a number of 1s less than $\lambda t$.

In this embodiment, the elements of $C_\alpha$ represent keywords in the meaning of the invention.

It should be noted that this supplemental step is optional. One can simply apply step 106 to the keywords $c_\alpha//\alpha$.

Then, the hash functions of the second family H' are applied to these keywords in step 106.

For any integer $\beta$ between 1 and v, where $c_e$ is a member of $C_\alpha$, a value $\gamma_e$ is determined according to the following equation:

$$\gamma = h'_\beta(c_e//\alpha)$$

where $c_e//\alpha$ represents a concatenation of the value of $c_e$ and the value of $\alpha$.

Lastly, the management unit 11 updates the Bloom filters $B_1$ to $B_m$ by storing the addresses of the biometric data $b_i$ in their encrypted form $E(@b_i)$ (step 108) for all i, in the corresponding filters $By_e$, meaning the filters that have an identifier, meaning an index, which corresponds to the result of applying functions from the second family of hash functions H' to the keywords.

As a result, the address of $b_i$ in encrypted form is stored in each of the Bloom filers having an index $\gamma_e$ which satisfies the equation:

$$\gamma_e = h'_\beta(c_e//\alpha)$$

or, in the case where the supplemental step described above is not applied:

$$\gamma_\alpha = h'_\alpha(c_\alpha//\alpha)$$

After this enrollment step, the system is ready to carry out an identification phase on the basis of stored encrypted biometric data and a new captured biometric data item.

Figure 4:
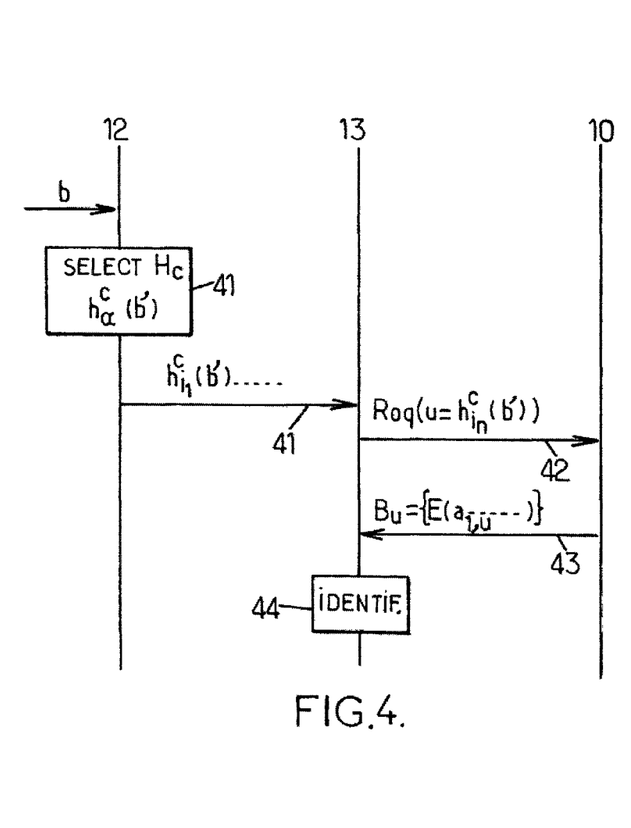
FIG. 4 illustrates an identification phase according to one embodiment of the invention.

FIG. 4 illustrates such an identification phase according to one embodiment of the invention.

In this identification phase, a new biometric data item b' is captured at the transmitter 12. This transmitter then chooses a set of hash functions from the first family of hash functions H. It applies the functions of this set H to the biometric data item b'. Then it concatenates each of the results so obtained to the index of the corresponding hash function in order to generate keywords. These keywords are then submitted to a set of functions from the second family of hash functions H' in order to obtain hashed keywords to be used to request a search in the database 10 on the basis of these hashed keywords.

The principle of applying hash functions from the first family H then applying hash functions from the second family H', at the transmitter, is similar to the one applied in the management unit during the enrollment phase. However, to simplify the following description, the obtained result, meaning the hashed keywords, are denoted $h_j{}^c(b')$, i being between 1 and k and j being between 1 and s, where k is the number of applied hash functions coming from the first family of functions and s is the number of applied hash functions coming from the second family of functions, and the notation $h^c$ represents the principle of applying hash functions as described above.

Then at the transmitter 12, the value of $h_\alpha{}^c(b')$ is calculated for at least one of said integers i where $\alpha$ is between $i_1$ and $i_2$.

All these values $h_\alpha{}^c(b')$ are then sent to the identification unit 13 in a message 41.

On the basis of these values, the identification unit 13 queries 42 the database 10 in order to retrieve data associated with the filters $B_u$ of index u such that u is equal to the values $h_\alpha{}^c(b')$ received.

The identification unit 13 then receives from the database the response 43 to this query 42, for any u equal to $h_\alpha{}^c(b')$ At this point, the identification unit 13 has access to the addresses of sets of encrypted biometric data which are close to the biometric data item b'.

The identification unit 13 can then, on the basis of the key used for encryption, find the addresses of the stored biometric data and compare them to each other.

Advantageously, it can then decide that, if at least one address appears in all the $B_u$ retrieved, the obtained addresses concern one or more encrypted biometric data items which correspond to the newly captured biometric data item b'. In this case, the user currently being identified is then considered to be identified.

It may be advantageous to restrict the information obtained by the identification unit 13. To do this, in one embodiment of the invention, the identification unit 13 only retrieves the addresses that are present in a minimum number of $B_u$. This embodiment is for example based on the use of a secret sharing scheme such as the one described in the document by A. Shamir, "How to share a secret", Commun. ACM, 1979.

In one embodiment, one can use only conventional Bloom filters without the storage characteristic, and/or not store encrypted biometric data if later steps in the verification process are not applied.

If no common address appears in the retrieved $B_u$, it is then decided that the user currently being identified has not been identified.

Thus the keyword-based search of a database according to the present invention obtains a list of storage addresses for candidates that are potentially close to the biometric data item to be identified b'.

In certain cases, it may be advantageous to consolidate this list by performing a final verification.

To do this, the database can be requested to send the data stored at said addresses in the list, in order to perform a verification on the retrieved and decrypted biometric data.

A cryptosystem can be provided for this purpose which enables the encryption of bits such that it is possible to calculate in an encrypted manner an XOR (+) of two messages m and m', based on encrypted messages m and m'.

This can be based on the scheme described in the document "Evaluating 2-DNF Formulas on Cipher-texts" by Boneh, Goh and Nissim, Theory of Cryptography, Second Theory of Cryptography Conference, LNCS3378, 2005, or on the cryptosystem described in "Probabilistic encryption and how to play mental poker keeping secret all partial information" by Goldwasser and Micali, ACM, 1982. This last work corresponds to a homomorphic scheme such that for a pair of keys (pk; sk) and two messages m; m' contained in the set $\{0,1\}$, the following equation is satisfied:

$$D(E(m;pk) \times E(m';pk);sk) = m(+)m'$$

where E and D are respectively the encryption and decryption functions with the secret key sk and the public key pk.

The biometric data b stored in the database 10 are stored in bit-by-bit encrypted form according to the equation:

$$E(b;pk) = (E(b_i;pk); \ldots ; E(b_n;pk))$$

In this context, a verification step according to one embodiment of the invention corresponds to a calculation of the Hamming distance.

The following can then be done:

sending a message comprising E(b'; pk) to the database 10;

calculating at the database 10, for any biometric data item b of the database 10:

$$E(b;pk) \times E(b';pk);$$

sending a query from the identification unit 13 to retrieve the results of the above calculation;

receiving from the database 10 a Hamming distance between the biometric data item b and the item $b_i$ stored at the address $@b_i$; retrieved from the filters $B_u$, said data item being in an encrypted form that the identification unit 13 is able to decrypt.

Thus, advantageously, the identification unit ultimately obtains only a Hamming distance between the captured biometric data item and a candidate in the database. In addition, here the database learns nothing about the operations performed.

The invention claimed is:

1. A management method for storing and indexing biometric data in a database in encrypted form, said database comprising a set of filters (B1, . . . , Bm) respectively associated with filter identifiers; wherein said management method comprises the following steps at a management unit:

/1/ receiving a biometric data item;

/2/ storing, at a given address in the database, said biometric data item in encrypted form;

/3/ obtaining keywords based on a first set of hash functions and on said biometric data item;

/4/ associating a subset of indexing filters with each keyword by selecting filters for each keyword as a function of the respectively associated filter identifiers, of said keywords, and of a second set of hash functions; and /5/ associating said given address in encrypted form with each of the filters in the subset of indexing filters.

2. The management method of claim 1, wherein step /3/ is implemented by the following steps:

obtaining respective first hash values by applying the first set of hash functions to the biometric data item;

obtaining said keywords by respectively combining said first hash values with respective identifiers of the hash functions in the first set of hash functions.

3. The management method of claim 1, wherein step /4/ is implemented by the following steps:

obtaining second hash values by respectively applying the second set of hash functions to the keywords;

selecting each filter from the subset of indexing filters with which is associated a filter identifier which corresponds to said second hash values.

4. The management method of claim 1, wherein a first family and a second family of hash functions are initially determined, and wherein the first set and the second set of hash functions are respectively a subpart of said first family and second family of hash functions.

5. The management method of claim 1, wherein step /4/ is also implemented on the basis of an error limit.

6. The management method of claim 1, wherein the first set of hash functions is of the LSH type and the second set of hash functions is of the cryptographic type.

7. The management method of claim 1, wherein the filters in the set of filters are Bloom filters.

8. An identification method for identifying biometric data in a database managed by the management method of claim 3, said database comprising a structure based on filters (B1, . . . , Bm); wherein said identification method comprises the following steps at an identification unit which has access to the database;

/i/ receiving a query indicating hashed keywords;

/ii/ in the database, determining filters associated with said hashed keywords;

/iii/ obtaining a list of database addresses in encrypted form which are respectively associated with said determined filters;

/iv/ deciding that the keywords have a correspondence in the database, when a same address in said list of database addresses is associated with at least a determined number of filters.

9. The identification method of claim 8, wherein the hashed keywords are received from a transmitter, said transmitter having obtained the hashed keyword by the following steps:

capturing a biometric data item;

obtaining hash values by respectively applying a third set of hash functions to said captured biometric data item;

obtaining the keywords by respectively combining said first hash values with respective identifiers of hash functions in the third set; and obtaining hashed keywords by applying a fourth set of hash functions to said keywords.

10. The identification method of claim 9, wherein the first and third sets of hash functions come from a first family of hash functions and the second and fourth sets of hash functions come from a second family of hash functions.

11. A database management unit adapted to implement the management method of claim 1.

12. An identification unit adapted to implement the identification method of claim 8.

13. An identification system comprising the database management unit of claim 11, a database, and an identification unit.

* * * * *